(12) United States Patent
Aoyagi et al.

(10) Patent No.: US 11,864,080 B2
(45) Date of Patent: Jan. 2, 2024

(54) USER DEVICE

(71) Applicant: NTT DOCOMO, INC., Tokyo (JP)

(72) Inventors: Kenichiro Aoyagi, Tokyo (JP); Atsushi Minokuchi, Tokyo (JP); Hiroshi Ishikawa, Tokyo (JP); Shinya Takeda, Tokyo (JP); Maoki Hikosaka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 278 days.

(21) Appl. No.: 17/292,859

(22) PCT Filed: Oct. 23, 2019

(86) PCT No.: PCT/JP2019/041531
§ 371 (c)(1),
(2) Date: May 11, 2021

(87) PCT Pub. No.: WO2020/100541
PCT Pub. Date: May 22, 2020

(65) Prior Publication Data
US 2021/0400458 A1    Dec. 23, 2021

(30) Foreign Application Priority Data

Nov. 16, 2018  (JP) ................... 2018-216026

(51) Int. Cl.
*H04W 4/90* (2018.01)
*H04W 4/44* (2018.01)
*H04W 72/30* (2023.01)

(52) U.S. Cl.
CPC ............. *H04W 4/90* (2018.02); *H04W 4/44* (2018.02); *H04W 72/30* (2023.01)

(58) Field of Classification Search
CPC .......... H04W 4/90; H04W 4/44; H04W 72/30
See application file for complete search history.

(56) References Cited

U.S. PATENT DOCUMENTS

| 8,964,708 B2* | 2/2015 | Petite .................... H04L 67/125 370/338 |
| 9,973,899 B1* | 5/2018 | Andrews ................. H04W 4/06 |
| 2009/0268700 A1* | 10/2009 | Son ......................... H04W 4/90 370/336 |

(Continued)

FOREIGN PATENT DOCUMENTS

| EP | 2 830 245 A1 | 1/2015 |
| JP | 2015-514349 A | 9/2013 |

OTHER PUBLICATIONS

International Search Report issued in PCT/JP2019/041531 dated Jan. 7, 2020 (7 pages).

(Continued)

*Primary Examiner* — Ernest G Tacsik
(74) *Attorney, Agent, or Firm* — Osha Bergman Watanabe & Burton LLP

(57) ABSTRACT

A disclosed user device includes a receiver configured to receive emergency information from a network; and a control unit configured to change a process of detecting whether first emergency information is duplicated with second emergency information upon receiving, by the receiver, the second emergency information after the first emergency information, based on the first emergency information.

5 Claims, 12 Drawing Sheets

(56) References Cited

U.S. PATENT DOCUMENTS

| | | | | |
|---|---|---|---|---|
| 2011/0165855 A1* | 7/2011 | Hapsari | ............... | H04L 12/1895 |
| | | | | 455/404.1 |
| 2011/0171929 A1* | 7/2011 | Tamura | ................. | H04W 48/12 |
| | | | | 455/404.1 |
| 2013/0223626 A1* | 8/2013 | Edge | ..................... | H04W 12/10 |
| | | | | 455/411 |
| 2013/0281045 A1* | 10/2013 | Daly | ....................... | H04L 67/55 |
| | | | | 455/404.1 |
| 2014/0011505 A1* | 1/2014 | Liao | ..................... | H04W 72/30 |
| | | | | 455/450 |
| 2014/0179255 A1* | 6/2014 | Drapkin | ................. | H04L 51/00 |
| | | | | 455/404.1 |
| 2015/0087296 A1 | 3/2015 | Kim et al. | | |
| 2017/0171814 A1* | 6/2017 | Belghoul | ................ | H04W 4/90 |
| 2017/0201871 A1* | 7/2017 | Ryu | ........................ | H04W 4/06 |
| 2019/0313232 A1* | 10/2019 | Lee | ......................... | H04W 4/90 |
| 2021/0368318 A1* | 11/2021 | Xu | ......................... | H04W 4/12 |

OTHER PUBLICATIONS

Written Opinion of the International Searching Authority issued in PCT/JP2019/041531 dated Jan. 7, 2020 (5 pages).

3GPP TS 23.501 V15.3.0; "3rd Generation Partnership Project; Technical Specification Group Services and System Aspects; System Architecture for the 5G System; Stage 2 (Release 15)"; Sep. 2018 (226 pages).

3GPP TS 23.041 V15.3.0; "3rd Generation Partnership Project; Technical Specification Group Core Network and Terminals; Technical realization of Cell Broadcast Service (CBS) (Release 15)"; Sep. 2018 (96 pages).

Office Action issued in the counterpart European Application No. 19884796.4, dated Feb. 20, 2023 (5 pages).

TSG SA Meeting #47; SP-100126 "2 CRs to 23.401 (ETWS, Rel-8, Rel-9)" SA WG2; Vienna, Austria; Mar. 22-25, 2010 (11 pages).

\* cited by examiner

FIG.5

| Octet 1 | | | | | | | | Octet 2 | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| GS | | | Message Code | | | | | | | | | Update Number | | | |

USER DEVICE

TECHNICAL FIELD

The present invention relates to a user device for a communication system.

BACKGROUND ART

In 3rd Generation Partnership Project (3GPP), to further increase the system capacity, to further increase the data transfer rate, and to further reduce delays in the radio section, a radio communication technology called 5G or New Radio (NR) is being researched (hereafter, the radio communication technology is referred to as "5G" or "NR"). In 5G, to achieve requirements including a throughput of greater than or equal to 10 Gbps and a delay of less than or equal to 1 ms in the radio section, various radio technologies are being discussed.

A network architecture being discussed in NR includes 5G Core Network (5GC) corresponding to Evolved Packet Core (EPC) that is a core network in the Long Term Evolution (LTE) network architecture and Next Generation-Radio Access Network (NG-RAN) corresponding to Evolved Universal Terrestrial Radio Access Network (E-UTRAN) that is a radio access network (RAN) in the LTE network architecture (see, for example, Non-patent Document 1).

In the LTE and 5G systems, for example, a PWS (Public Warning System) that implements a service for delivering messages of ETWS (Earthquake and Tsunami Warning System) such as Earthquake Early Warning System to UE (User Equipment) by CBS (Cell Broadcast Service) is being studied (for example, Non-Patent Document 2).

RELATED ART DOCUMENTS

[NON-PATENT DOCUMENT 1] 3GPP TS 23.501 V15.3.0 (2018-09)
[NON-PATENT DOCUMENT 2] 3GPP TS 23.041 V15.3.0 (2018-09)

SUMMARY OF THE INVENTION

Problem to be Solved by the Invention

In the LTE or NR, simultaneous delivery of traffic information to vehicles or pedestrians using, for example, cellular V2X is being studied. However, when delivering traffic information using a PWS (Public Warning System) for delivering disaster information, a service for delivering disaster information and a service for delivering traffic information differ in the frequency of delivering information. For example, when a user device moves between cells, duplicated receiving processes in CBS (Cell Broadcast Service) need to be adjusted in accordance with different services.

The present invention has been made in view of the above-described problem, and is intended to enable a user device to change, upon receiving of emergency information, control in a receiving process of the emergency information so as to receive the emergency information appropriately.

Means for Solving the Problem

An aspect of this disclosure provides a user device that includes
a receiver configured to receive emergency information from a network; and
a control unit configured to change a process of detecting whether first emergency information is duplicated with second emergency information upon receiving, by the receiver, the second emergency information after the first emergency information, based on the first emergency information.

Advantageous Effect of the Present Invention

According to the disclosed technology, a user device is enabled to change the control, upon receiving of emergency information, so as to receive the emergency information appropriately.

BRIEF DESCRIPTION OF THE DRAWINGS

FIG. 5 is a diagram illustrating an example of a message format.

EMBODIMENTS FOR CARRYING OUT THE INVENTION

Embodiments of the present invention are described below with reference to the accompanying drawings. Embodiments described below are examples, and the present invention is not limited to those embodiments.

In operations of a radio communication system according to an embodiment of the present invention, related-art technologies may also be used as necessary. The related-art technologies are, for example, but are not limited to, current LTE technologies. Unless otherwise mentioned, the term "LTE" used in the present application has a broad meaning and includes LTE-Advanced, systems subsequent to LTE-Advanced (e.g., NR), and a wireless local area network (LAN).

In an embodiment of the present invention, to "configure" radio parameters may indicate that radio parameters are pre-configured using predetermined values, or radio parameters are set to values transmitted from the network node 10 and the user device 20.

Figure 1:
FIG. 1 is a diagram illustrating an example (1) of a network architecture.

FIG. 1 is a diagram illustrating an example (1) of a network architecture. For example, FIG. 1 illustrates a network architecture of Public Warning System (PWS) for delivering Earthquake and Tsunami Warning System (ETWS) messages, such as Earthquake Early Warning, to UE via CBS (Cell Broadcast Service) in an LTE system. As illustrated in FIG. 1, the PWS network architecture of LTE includes UE, eNodeB (eNB), MME, CBC and CBE.

A cell broadcast entity (CBE) is a delivery source of emergency information such as the Japan Meteorological Agency. A cell broadcast center (CBC) manages CBS messages. A mobility management entity (MME) is a network node that accommodates one or a plurality of eNBs, and provides mobility control functions. As illustrated in FIG. 1, the CBE is connected to the CBC. The CBC is connected to the MME. The MME is connected to the eNB. The eNB is connected to the UE. Emergency information delivered by the CBE is received by the UE via the CBC, MME and eNB.

Figure 2:
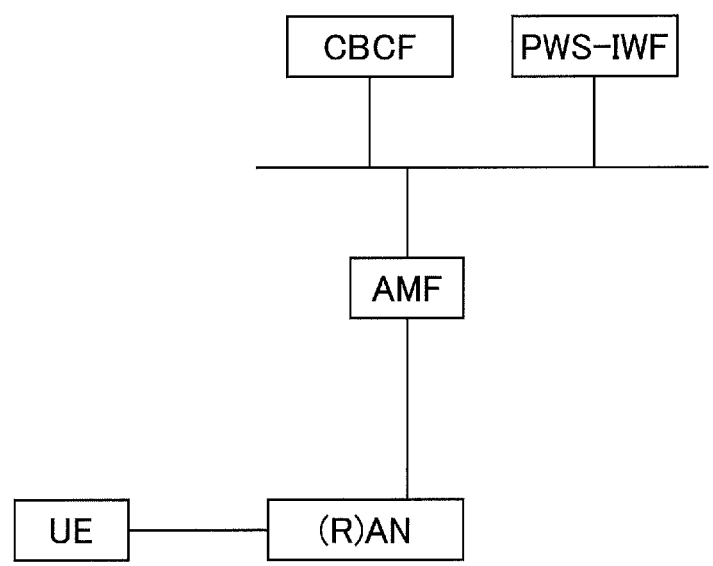
FIG. 2 is a diagram illustrating an example (2) of a network architecture.

FIG. 2 is a diagram illustrating an example (2) of a network architecture. FIG. 2 illustrates a PWS network architecture for delivering ETWS messages to the UE via Cell Broadcast Service (CBS) in a 5G system. The network architecture illustrated in FIG. 2 includes a plurality of network nodes 10, and UE, which is a user device 20. A radio access network (RAN) is a network node 10 having a radio access function and is connected to the UE, an access and mobility management function (AMF), and a user plane function (UPF). The RAN node may be referred to as a base station device or gNB (next generation Node B). The AMF is a network node 10 that includes functions such as a RAN interface terminal, a non-access stratum (NAS) terminal, registration management, connection management, reachability management, and mobility management. The AMF corresponds, for example, to the function of the MME 30 in LTE. The AMF may be connected to one or more CBCFs or to one or more RAN nodes.

The CBC Function (CBCF) illustrated in FIG. 2 has a function of managing CBS messages. The CBCF may be connected to multiple AMFs. The PWS-Inter working function (PWS-IWF) illustrated in FIG. 2 has a logical function to perform type conversion of CBS messages to correspond to NR. The AMF may be connected to one or more CBCFs or to one or more RAN nodes.

Figure 3:
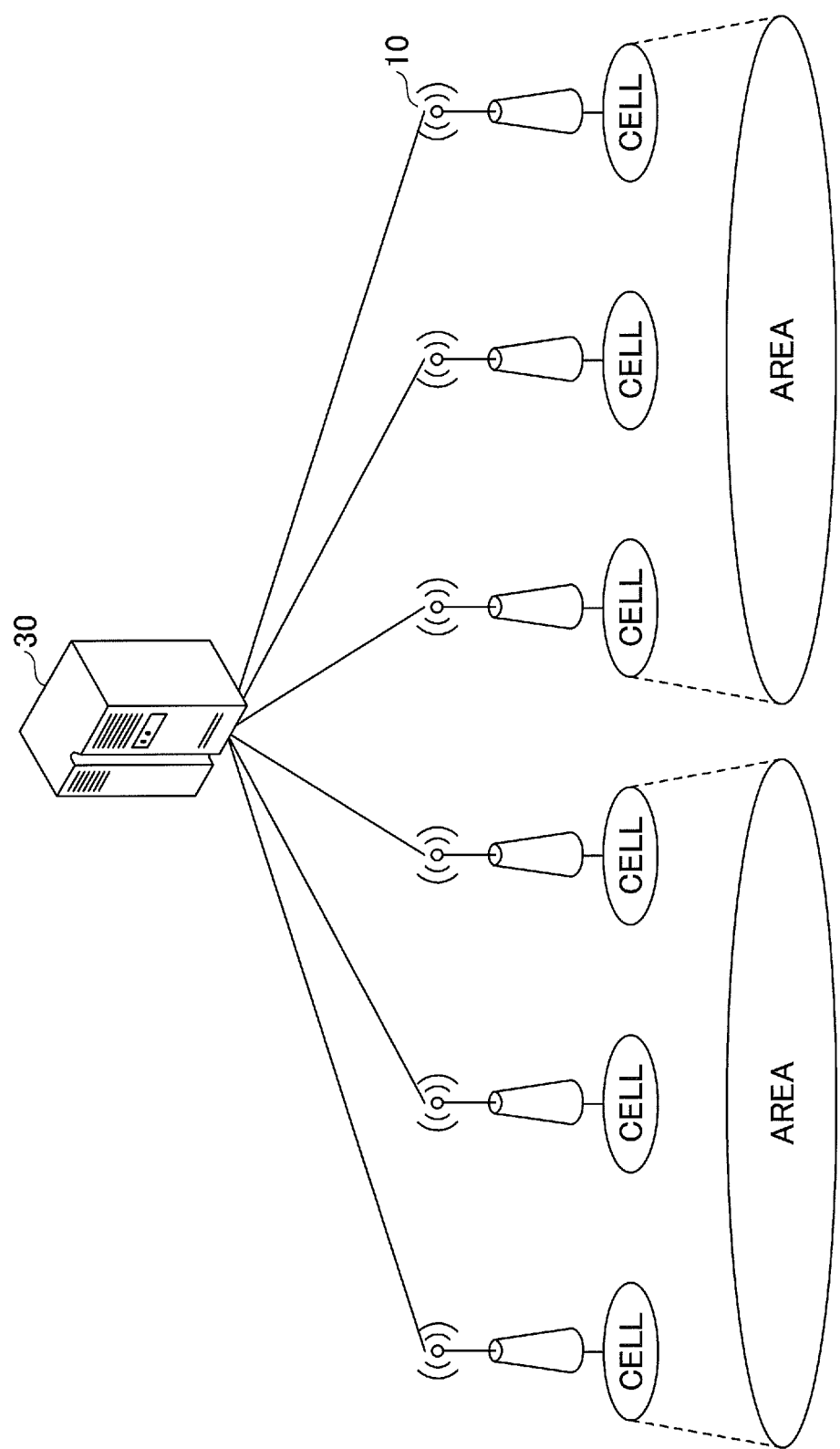
FIG. 3 is a diagram illustrating an example of a CBS delivery area.

FIG. 3 is a diagram illustrating an example of a CBS delivery area. As illustrated in FIG. 3, CBS messages may be delivered to respective cells of the eNBs 10 contained in the MME 30 or the AMF, or CBS messages may be delivered to respective areas each containing a plurality of cells.

Figure 4:
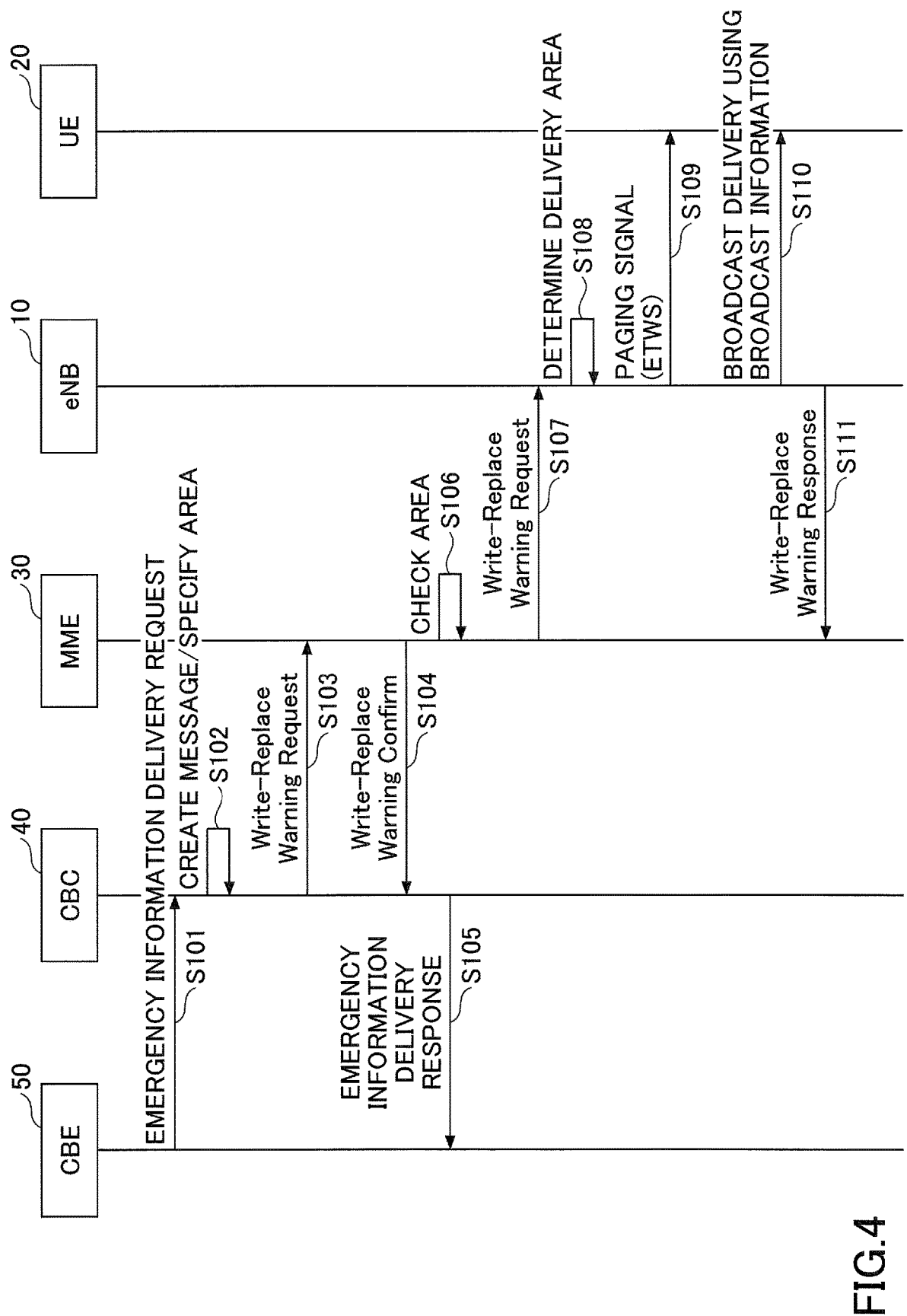
FIG. 4 is a sequence diagram illustrating an example of a message delivery procedure.

FIG. 4 is a sequence diagram illustrating an example of a message delivery procedure. FIG. 4 illustrates a sequence in which messages of the ETWS, such as Earthquake Early Warning, are delivered in an LTE system.

In step S101, the CBE 50 transmits an emergency information delivery request to the CBC 40. Subsequently, the CBC 40 creates an emergency information message, and specifies an area to which the message is delivered (S102). The area specification may be performed, for example, by cells or by areas.

In step S103, the CBC 40 transmits a "Write-Replace Warning Request" to the MME 30. The "Write-Replace Warning Request" is a signal for requesting emergency information to be transmitted from the CBC 40 to the MME 30, and to be subsequently transmitted from the MME 30 to the eNB 10. The "Write-Replace Warning Request" includes information such as disaster type, message body, and delivery area. Subsequently, the MME 30 transmits "Write-Replace Warning Confirm" to the CBC 40 (S104). The "Write-Replace Warning Confirm" is a response to the "Write-Replace Warning Request". In step S105, the CBC 40 transmits an emergency information delivery response to the CBE 50.

In step S106, the MME 30 performs an area check. The MME 30 specifies an eNB 10 as a delivery destination, based on the delivery area information included in the received "Write-Replace Warning Request". Subsequently, the MME 30 transmits the "Write-Replace Warning Request" to the specified eNB 10 (S107).

In step 108, the eNB 10 performs a delivery area determination process. When the received "Write-Replace Warning Request" contains a list of cells as a delivery area, the eNB 10 searches the list of cells for cells under the control of the eNB 10, and broadcasts messages to the corresponding cells included in the list of cells. When, for example, a tracking area identity (TAI) list is set as the delivery area, the eNB 10 searches the TAI list under the control of the eNB 10 for cells included in a corresponding TA, and broadcasts messages to the cells included in the corresponding TA. Similarly, even when the delivery area is a list of other areas (e.g., EA: Emergency Area), the eNB 10 broadcasts messages to cells included in the corresponding area.

In step S109, the eNB 10 transmits a paging signal of ETWS to the UE 20 in the cells included in the delivery area determined in step S108. Subsequently, the eNB 10 performs broadcast delivery using the broadcast information to the UE 20 in step S110. Subsequently, the eNB 10 transmits a "Write-Replace Warning Response" to the MME 30.

For example, the MME 30 may be replaced by a radio network controller (RNC) or AMF to deliver ETWS messages in a similar sequence in a 3G or 5G system.

FIG. 5 is a diagram illustrating an example of a message format. Parameters of messages used to transmit at the LTE or NR radio interface include message ID, serial number, CB data and data coding scheme, joint warning area, etc.

The message ID identifies a type of emergency information. Types of emergency information include, for example, earthquake information, tsunami information, earthquake and tsunami information, accident information, etc.

The serial number illustrated in FIG. 5 identifies a separate CBS message. The "GS" in the serial number indicates the geographical scope to which the message applies. For example, "00" indicates a cell, "01" indicates a public land mobile network (PLMN), "10" indicates a tracking area, and "11" indicates a cell. Note that if "00", the corresponding message may be displayed immediately on the screen of the UE 20. The "Message Code" contained in the serial number is used to identify CBS messages having the same message ID.

Figure 6:
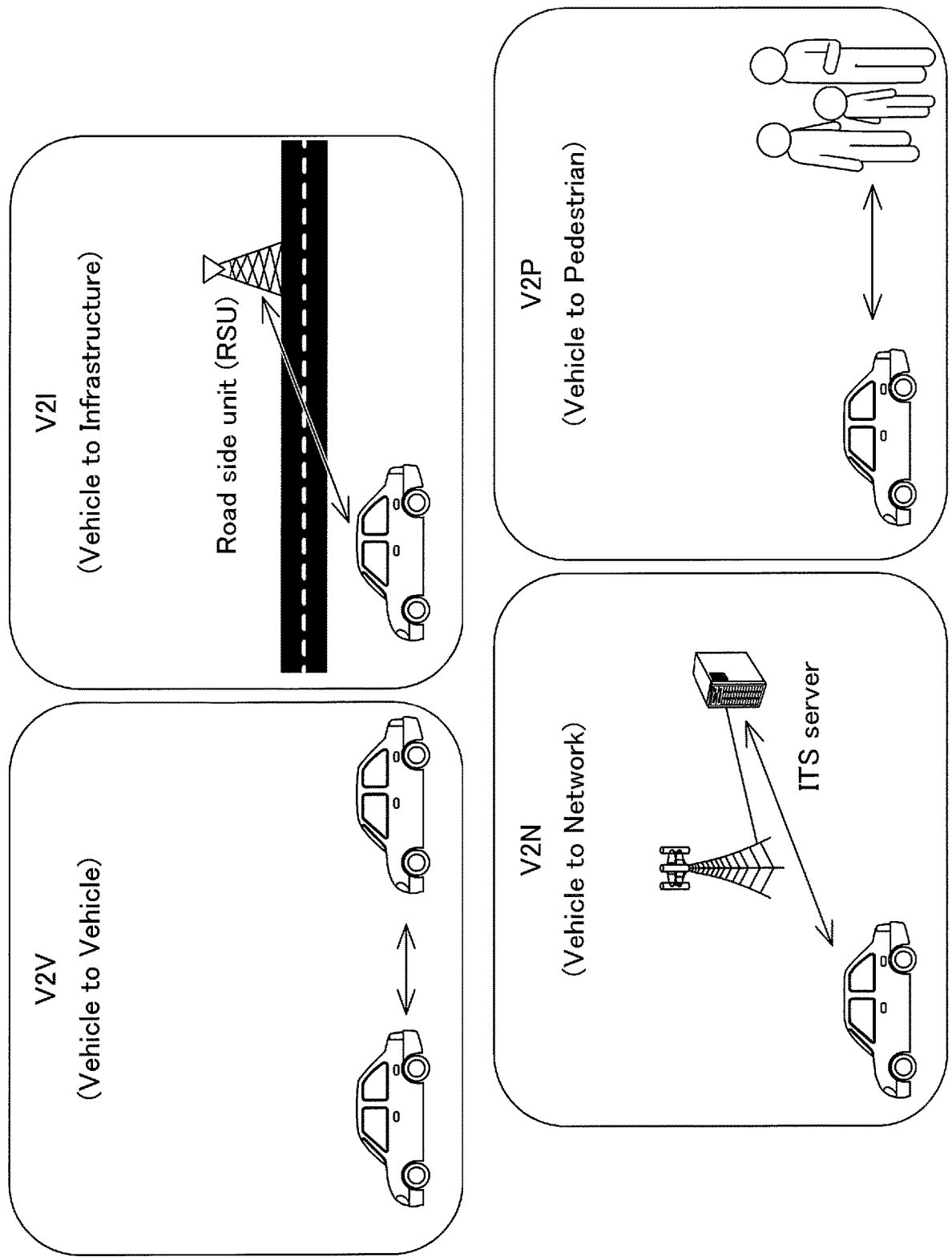
FIG. 6 is a diagram illustrating V2X.

FIG. 6 is a diagram illustrating V2X. In the 3GPP, the D2D function is being extended to implement either V2X (Vehicle to Everything) or eV2X (enhanced V2X) and specification is being promoted. As illustrated in FIG. 1, V2X is part of intelligent transport systems (ITS), indicates a collective term for the form of communications, including vehicle to vehicle (V2V), which indicates the form of communication between vehicles, vehicle to infrastructure (V2I), which indicates the form of communication between vehicles and road-side unit (RSU), vehicle to network (V2N), which indicates the form of communication between vehicles and ITS servers, and vehicle to pedestrian (V2P), which indicates the form of communication between vehicles and mobile terminals owned by pedestrians.

In addition, V2X using LTE or NR cellular communication and direct communication between terminals is being studied in 3GPP. V2X using cellular communication is also called cellular V2X. In NR V2X, implementation of large capacity, low delay, high reliability, and quality of service (QoS) control is being studied.

It is assumed that the LTE or NR V2X will be studied beyond the 3GPP specification in the future. For example, it is assumed that interoperability, cost reduction by upper layer implementation, RAT (Radio Access Technology) combination or switching methods, regulatory compliance in each country, data acquisition, delivery, database management and use of LTE or NR V2X platforms will be studied.

In embodiments of the present invention, it is primarily assumed that a communication device is installed in a vehicle, but embodiments of the present invention are not limited to such embodiments. For example, the communication device may be a terminal held by a person, the communication device may be a drone or airborne device, and the communication device may be a base station, an RSU, a relay station (relay node), a user device having scheduling capabilities, and the like.

In the case of cellular V2X, simultaneous delivery of information from the cellular network to a vehicle or pedestrian is being studied. Information for vehicles or pedestrians is traffic information such as, for example, accident information, traffic congestion information, etc. PWS or ETWS is specified as one of the methods for simultaneously delivering information to multiple UEs.

The duplication detection function in the ETWS is aimed at preventing the UE from receiving the same emergency information repeatedly when the UE moves between cells. For example, with the standard specification in Japan, the duplication detection function for an ETWS message is performed for one hour after receiving the ETWS message. Further, with the standard specification in other countries, the duplication detection function for an ETWS message is performed for 24 hours after receiving the ETWS message.

Here, when comparing disaster information with traffic information, the traffic information is more frequently delivered, and needs to be received multiple times during the UE movement. Thus, if the duplication detection function similar to that of the disaster information is performed on the traffic information, there is a possibility that the reception of traffic information may be hindered. However, it is necessary to protect receiving operations of the traffic information so as not to be affected by a duplication detection function, which is performed on emergency information including disaster information such as earthquakes and tsunamis.

Figure 7:
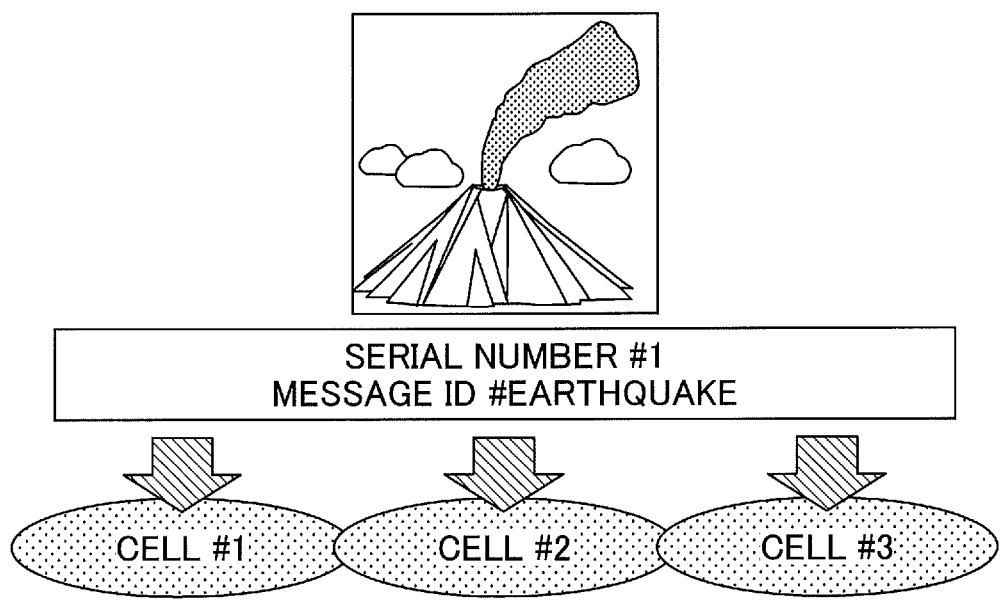
FIG. 7 is a diagram illustrating an example (1) of message delivery according to an embodiment of the present invention.

FIG. 7 is a diagram illustrating an example (1) of message delivery according to an embodiment of the present invention. In the duplication detection function, when the message IDs and serial numbers between two or more messages are compared and determined to be the same, it is determined that the messages are duplicated. In the example of emergency information delivery pertaining to an earthquake illustrated in FIG. 7, emergency information with the message ID "earthquake" and the serial number "1" is delivered. In cell #1, cell #2, and cell #3, the same message ID and serial number emergency information are delivered. For example, when emergency information received in cell #1 is received again in cell #2 or cell #3 during the duration of the duplication detection function, emergency information received in cell #2 or cell #3 is ignored by the determination of the duplication detection function. In addition to the message ID and serial number comparison by using the duplication detection function, the UE may also check whether the CB data is the same.

Figure 8:
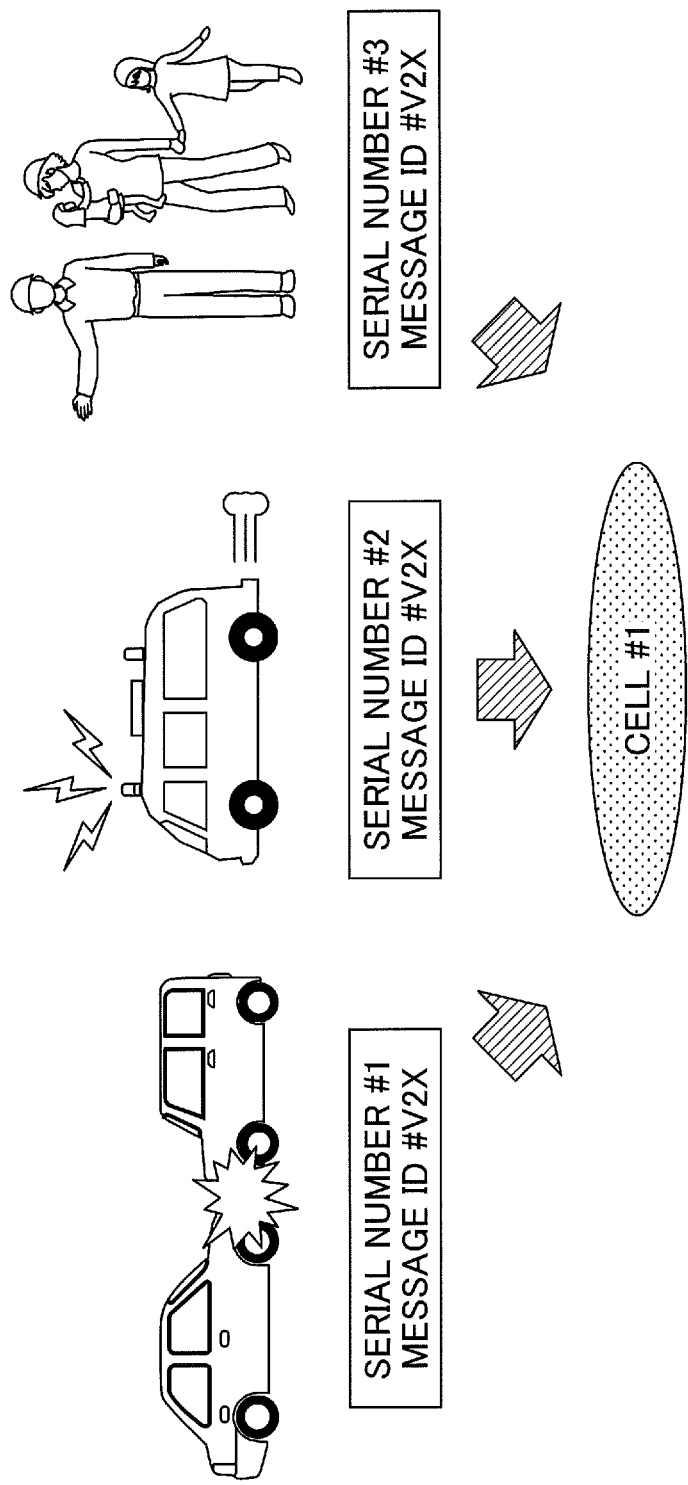
FIG. 8 is a diagram illustrating an example (2) of message delivery according to an embodiment of the present invention.

FIG. 8 is a diagram illustrating an example (2) of message delivery according to an embodiment of the present invention.

In the example of emergency information delivery pertaining to traffic information illustrated in FIG. 8, although the message ID is common with "V2X", the serial number of the traffic accident information is assigned with "1", the serial number of the emergency vehicle traffic information is assigned with "2", and the serial number of the evacuation guidance information is assigned with "3". Accordingly, even when the different emergency information pieces are delivered in the same cell #1 as illustrated in FIG. 8, the UE is able to receive the different emergency information pieces without being determined to be duplicated by the duplication detection function. Emergency information on traffic information is assumed to be generated by a large number of types of emergency information in one cell.

Here, when the UE moves to another cell other than cell #1, it is assumed that the message IDs and serial numbers between different emergency information pieces match when emergency information of a large number of different types is generated in one cell. Thus, for example, depending on the duration of the duplication detection function, the UE may determine different emergency information pieces as the same message and ignore the emergency information of the different type.

Accordingly, in a process of the duplication detection function, emergency information may be correctly received by changing the process according to a predetermined condition.

Figure 9:
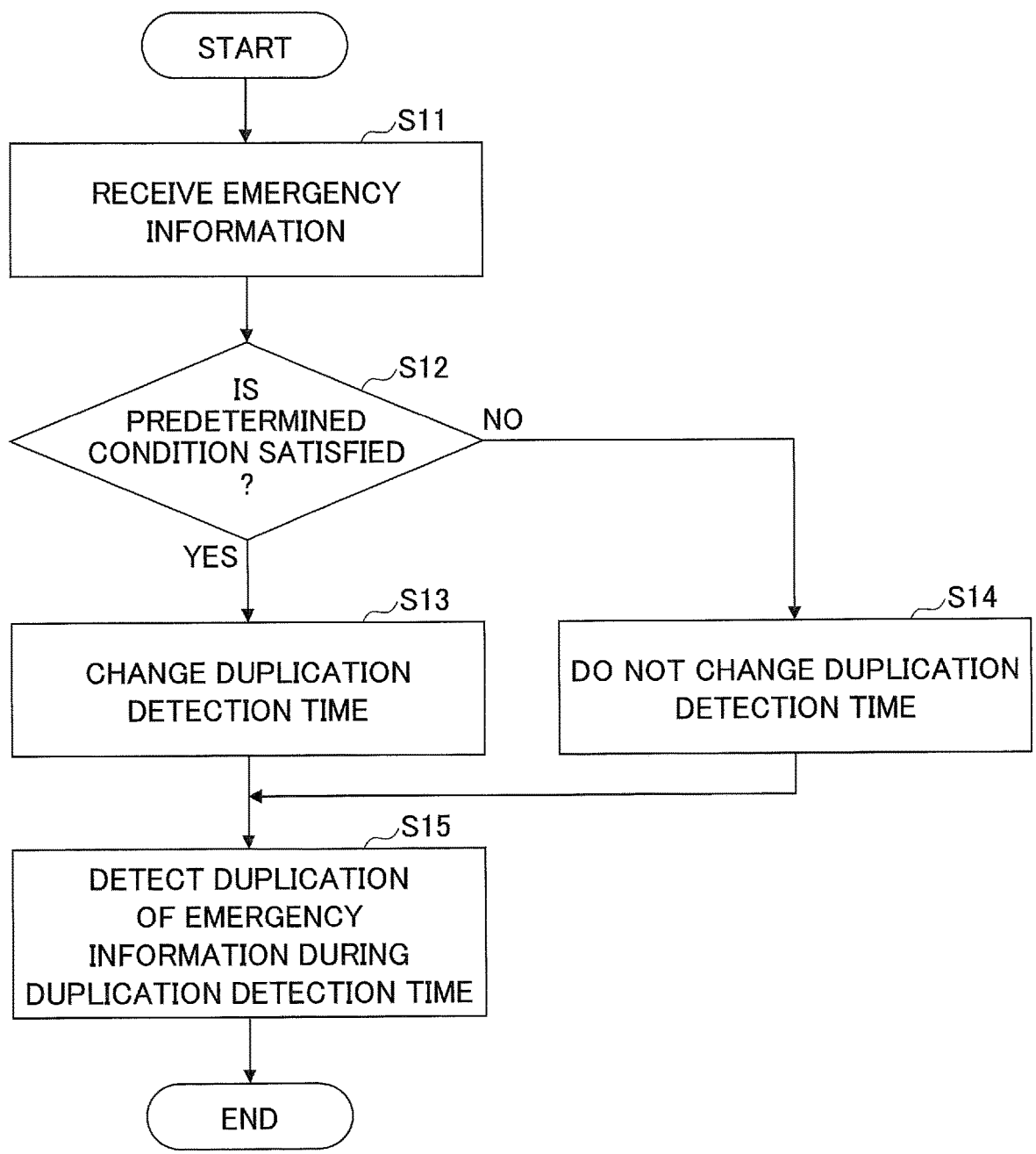
FIG. 9 is a flowchart illustrating an example (1) of an emergency information reception process according to an embodiment of the present invention.

FIG. 9 is a flowchart illustrating an example (1) of an emergency information reception process according to an embodiment of the present invention. In step S11, the UE receives emergency information. Subsequently, the UE performs a determination as to whether a predetermined condition is satisfied (S12). If the predetermined condition is satisfied (YES in S12), the process proceeds to step S13, and if the predetermined condition is not satisfied (NO in S12), the process proceeds to step S14. The predetermined condition may be a), b), c), and d) noted below.

a) UE receives emergency information with a predefined message ID. For example, the predetermined message ID may correspond to traffic information such as "V2X".

b) UE receives emergency information for a predetermined application. For example, the predetermined application may be an application relating to V2X.

c) UE detects predefined position information. For example, the predetermined position information may be that the UE is located on a "road".

c) UE detects a predetermined movement process. For example, the predetermined movement process may be handover or cell reselection.

In step S13, the UE changes duplication detection duration. For example, if the message ID is "V2X", the UE may change the duplication detection duration to shorten the duplication detection duration.

In step S14, the UE does not change the duplication detection duration. For example, when the message ID is disaster information such as "earthquake", the duplication detection duration is not changed.

In step S15, the UE detects duplication of emergency information during the set duplication detection duration.

Figure 10:
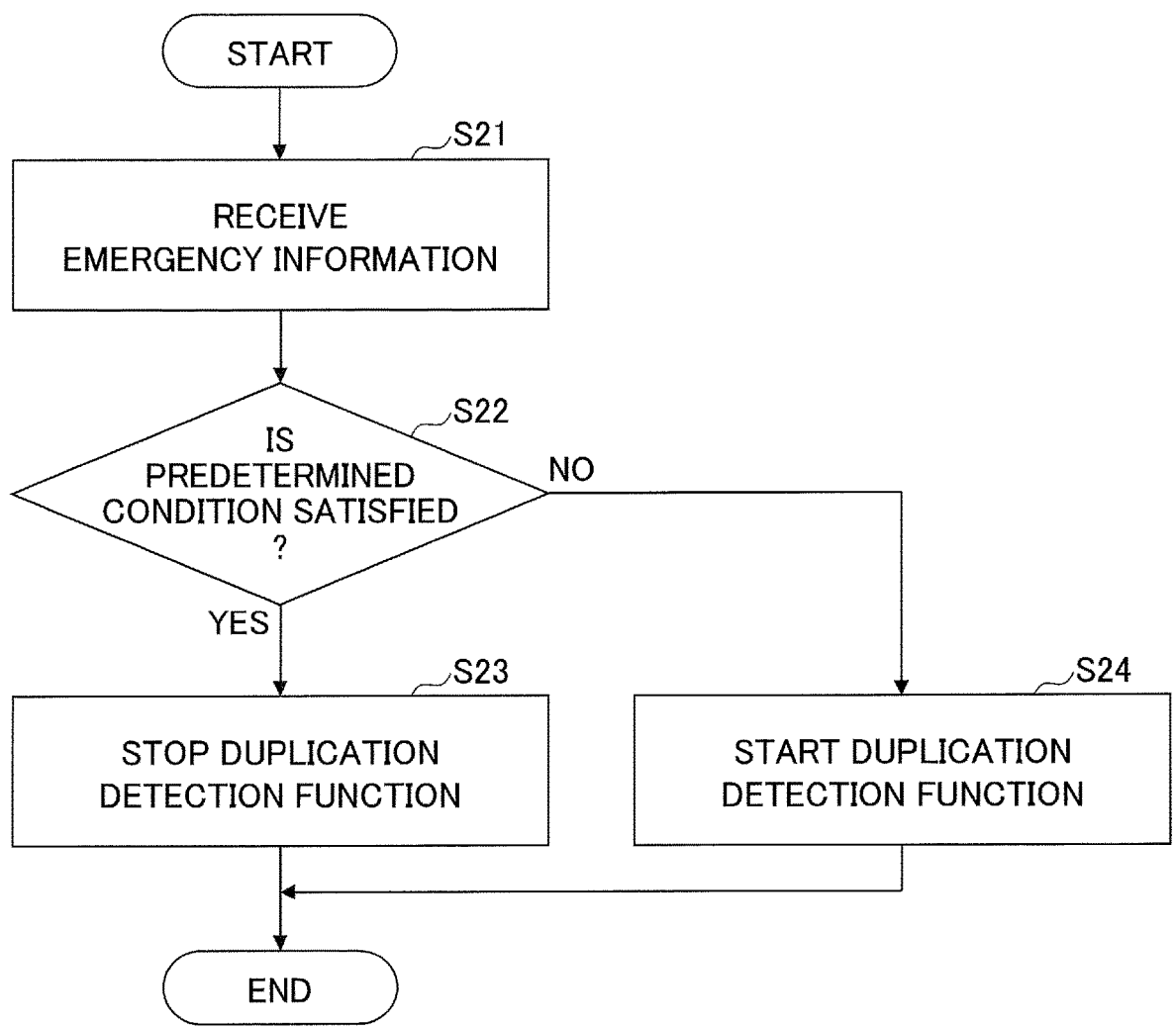
FIG. 10 is a flowchart illustrating an example (2) of an emergency information reception process according to an embodiment of the present invention.

FIG. 10 is a flowchart illustrating an example (2) of an emergency information reception process according to an embodiment of the present invention. Step S21 is similar to step S11 illustrated in FIG. 9, and step S22 is similar to step S12 illustrated in FIG. 9.

In step S23, the UE stops the duplication detection function. For example, if the message ID is "V2X", the UE may stop the duplication detection function.

In step S24, the UE starts the duplication detection function. For example, if the message ID is disaster information such as "earthquake", the UE may start the duplication detection function.

Figure 11:
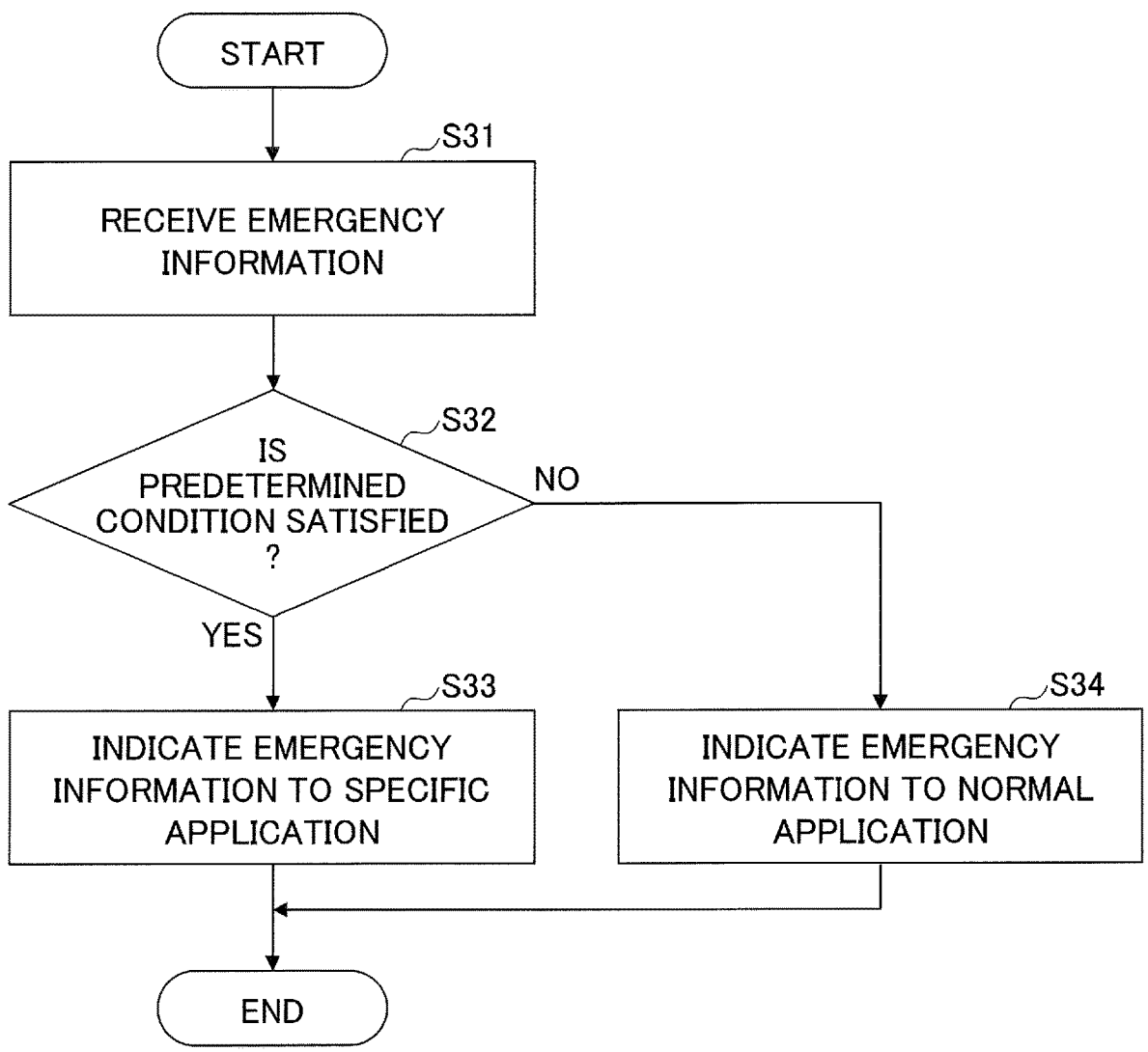
FIG. 11 is a flowchart illustrating an example (3) of an emergency information reception process according to an embodiment of the present invention.

FIG. 11 is a flowchart illustrating an example (3) of an emergency information reception process according to an embodiment of the present invention. Step S31 is similar to step S11 illustrated in FIG. 9, and step S32 is similar to step S12 illustrated in FIG. 9.

In step S33, the UE indicates the emergency information to a specific application. For example, if the message ID is "V2X", the UE may indicate the emergency information to an application corresponding to V2X.

In step S34, the UE indicates the emergency information to a normal application. For example, if the message ID is disaster information such as "earthquake", the UE may indicate the emergency information to the normal application.

According to the above-described embodiments, in the duplication detection process when the emergency information is received, the user device 20 may change the reception control of the emergency information according to a predetermined condition. For example, the user device 20 may change the reception control of the emergency information, based on the message ID of the emergency information, the application targeted for the emergency information, the position information of the user device 20, or the movement process of the user device 20, in the duplication detection process upon reception of the emergency information.

According to the disclosed technology, a user device is enabled to change the control, upon receiving of emergency information, to receive the emergency information appropriately.

(Configurations of Devices)

Next, examples of functional configurations of the network node 10 and the user device 20 that perform the above-described processes and operations are described. Each of the network node 10 and the user device 20 includes functions for performing processes according to the above-described embodiments. However, each of the network node 10 and the user device 20 may include a part of functions for performing processes according to the above-described embodiments.

<Network Node 10>

Figure 12:
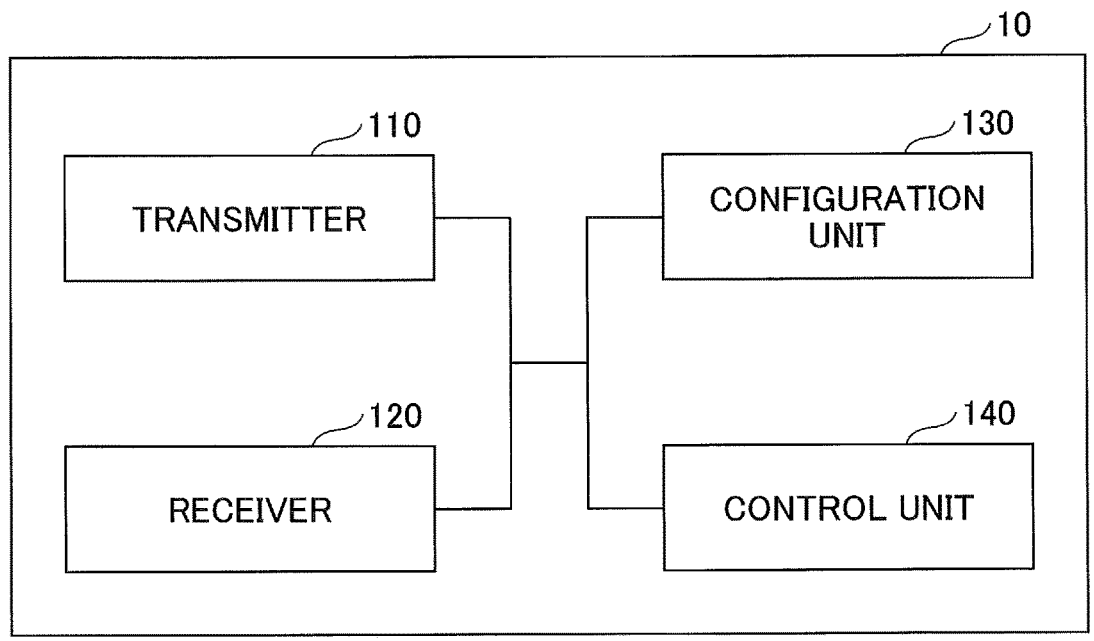
FIG. 12 is a diagram illustrating an example of a functional configuration of a network node 10 according to an embodiment of the present invention.

FIG. 12 is a diagram illustrating an example of a functional configuration of the network node 10. As illustrated in FIG. 12, the network node 10 includes a transmitter 110, a receiver 120, a configuration unit 130, and a control unit 140. The functional configuration illustrated in FIG. 12 is merely one example. As long as operations according to the embodiments of the present invention can be performed, the categorization and the names of the functional components may be freely changed. Also, a network node 10 including multiple different functions in the system architecture may be implemented by separate network nodes 10 having the corresponding functions.

The transmitter 110 includes functions to generate signals and transmit the signals to the user device 20 and other network nodes 10 via wired or wireless communications. The receiver 120 includes functions to receive various signals from the user device 20 and other network nodes 10 and obtain, for example, upper layer information from the received signals.

The configuration unit 130 stores preset configuration information and various types of configuration information to be transmitted to the user device 20 in a storage and reads the configuration information from the storage as necessary. The contents of the setting information are, for example, setting information pertaining to the delivery of CBS messages in PWS.

The contents of the setting information are, for example, setting information pertaining to the delivery of CBS messages in PWS. A functional unit relating to signal transmission in the control unit 140 may be included in the transmitter 110, and a functional unit relating to signal reception in the control unit 140 may be included in the receiver 120.

<User Device 20>

Figure 13:
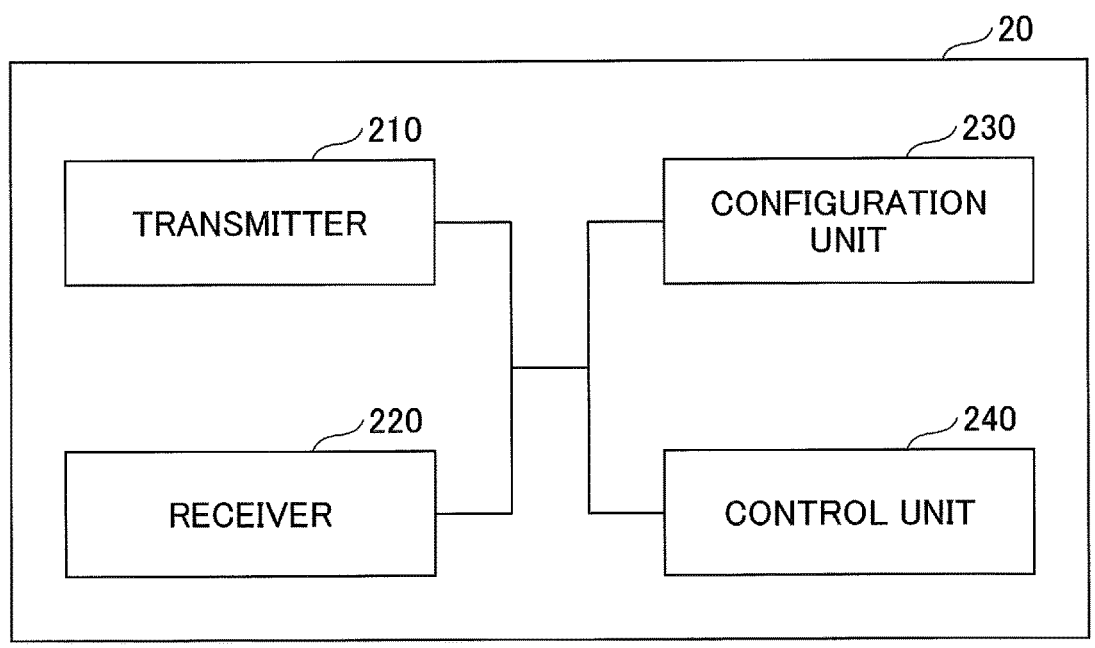
FIG. 13 is a diagram illustrating an example of a functional configuration of a user device 20 according to an embodiment of the present invention.

FIG. 13 is a diagram illustrating an example of a functional configuration of a user device 20. As illustrated in FIG. 13, the user device 20 includes a transmitter 210, a receiver 220, a configuration unit 230, and a control unit 240. The functional configuration illustrated in FIG. 13 is merely one example. As long as operations according to the embodiments of the present invention can be performed, the categorization and the names of the functional components may be freely changed.

The transmitter 210 generates a transmission signal from transmission data and wirelessly transmits the transmission signal. The receiver 220 wirelessly receives various signals and obtains upper layer signals from the received physical layer signals. The receiver 220 also includes a function to receive an NR-PSS, an NR-SSS, an NR-PBCH, and DL/UL control signals or reference signals.

The configuration unit 230 stores various types of configuration information received by the receiver 220 from the network node 10 in a storage and reads the configuration information from the storage as necessary. The configuration unit 230 also stores preset configuration information. The contents of the setting information are, for example, setting information pertaining to the delivery of CBS messages in PWS.

As described in the embodiments, the control unit 240 performs a reception process of CBS messages, and indicates necessary information to an upper layer. The control unit 240 performs control pertaining to a duplication detection function upon receiving of a CBS message. A functional unit relating to signal transmission in the control unit 240 may be included in the transmitter 210, and a functional unit relating to signal reception in the control unit 240 may be included in the receiver 220.

(Hardware Configuration)

The block diagrams (FIGS. 12 and 13) used in the above description illustrate functional blocks. Those functional blocks (components) may be implemented by hardware, software, or a combination of hardware and software. Also, the functional blocks may be implemented by any appropriate means. That is, each functional block may be implemented by one apparatus that is physically or logically integrated, or by two or more physically or logically separate apparatuses that are directly or indirectly connected (via lines and/or wirelessly) to each other. Each functional block may also be implemented by combining the one apparatus or the two or more apparatuses with software.

Examples of functions include, but are not limited to, determining, deciding, judging, calculating, computing, processing, deriving, investigating, searching, confirming, receiving, transmitting, outputting, accessing, solving, selecting, adopting, establishing, comparing, assuming, expecting, presuming, broadcasting, notifying, communicating, forwarding, configuring, reconfiguring, allocating, mapping, and assigning. For example, a functional block (or functional component) for transmitting may be referred to as a transmitting unit or a transmitter. As described above, the functional block may be implemented by any appropriate means.

Figure 14:
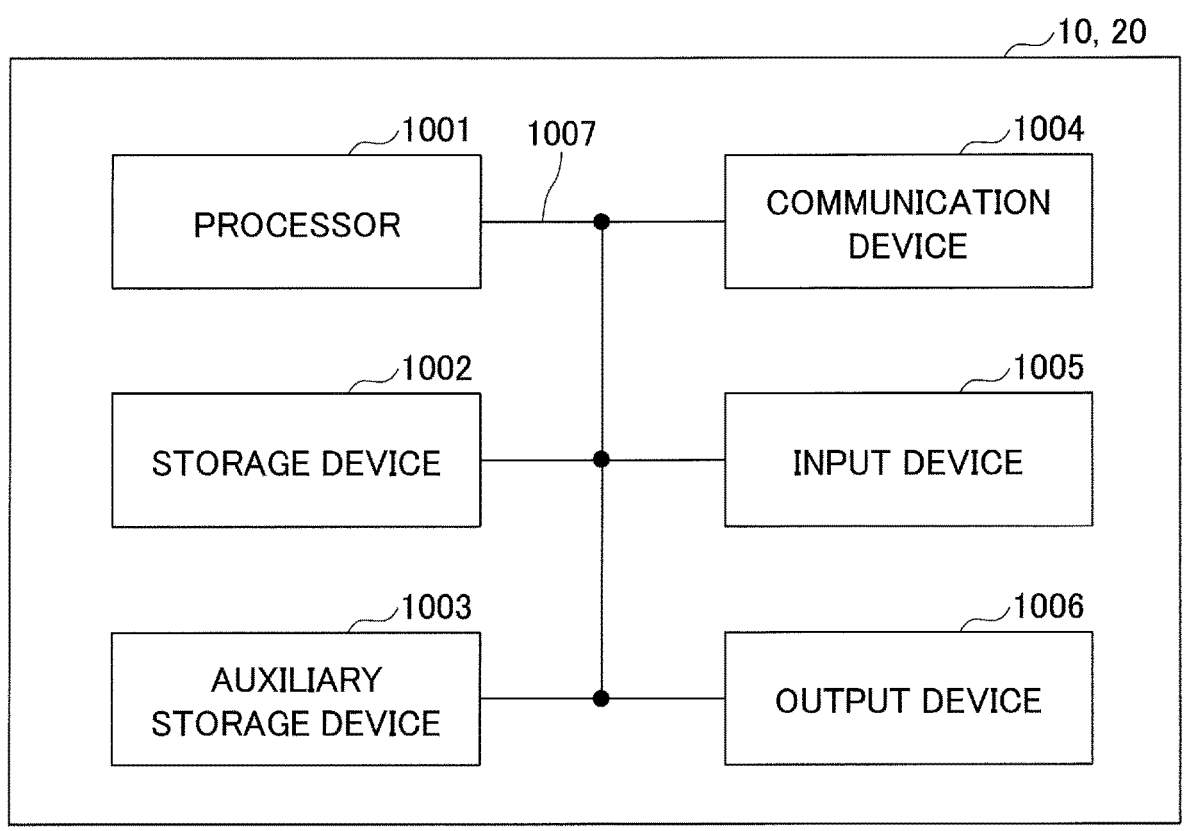
FIG. 14 is a diagram illustrating an example of a hardware configuration of the network node 10 or the user device 20 according to an embodiment of the present invention.

For example, the network node 10 and the user device 20 may be implemented by computers that perform radio communication methods of the embodiments. FIG. 14 is a diagram illustrating a hardware configuration of each of the network node 10 and the user device 20 according to an embodiment of the present disclosure. Physically, each of the network node 10 and the user device 20 may be implemented by a computer including a processor 1001, a storage device 1002, an auxiliary storage device 1003, a communication device 1004, an input device 1005, an output device 1006, and a bus 1007.

In the descriptions below, the term "device" may be replaced with, for example, "circuit", "module", or "unit". The hardware configuration of the network node 10 and the user device 20 may include one or more components illustrated in FIG. 14 and may not necessarily include all of the components.

Functions of the network node 10 and the user device 20 may be implemented by loading software (programs) into hardware components such as the processor 1001 and the storage device 1002, executing the loaded software by the processor 1001, and thereby controlling communications performed by the communication device 1004 and data read/write operations of the storage device 1002 and the auxiliary storage device 1003.

The processor 1001, for example, runs an operating system to control the entire computer. The processor 1001 may be implemented by a central processing unit (CPU) that includes interfaces with peripheral devices, a controller, an arithmetic unit, and registers. For example, the control unit 140 and the control unit 240 may be implemented by the processor 1001.

The processor 1001 loads programs (program code), software modules, and data from the auxiliary storage device 1003 and/or the communication device 1004 into the storage device 1002, and performs various processes according to the loaded programs, software modules, and data. The programs cause the computer to perform at least a part of the processes described in the above embodiments. For example, the control unit 140 of the network node 10 in FIG. 12 may be implemented by a control program that is stored in the storage device 1002 and executed by the processor 1001. Also, the control unit 240 of the user device 20 in FIG. 13 may be implemented by a control program that is stored in the storage device 1002 and executed by the processor 1001. The processes described above may be performed by one processor 1001 or may be performed concurrently or sequentially by two or more processors 1001. The processor 1001 may be implemented by one or more chips. The programs may be received from a network via a telecommunication line.

The storage device 1002 is a computer-readable storage medium and may be implemented by, for example, at least one of a read-only memory (ROM), an erasable programmable ROM (EPROM), an electrically-erasable programmable ROM (EEPROM), and a random access memory (RAM). The storage device 1002 may also be referred to as a register, a cache, or a main memory. The storage device 1002 can store programs (program code) and software modules that are executable to perform communication methods of the above embodiments.

The auxiliary storage device 1003 is a computer-readable storage medium and may be implemented by, for example, at least one of an optical disk such as a compact-disk ROM (CD-ROM), a hard disk drive, a flexible disk, a magneto-optical disk (e.g., a compact disk, a digital versatile disk, or a Blu-ray (registered trademark) disk), a smart card, a flash memory (e.g., a card drive, a stick drive, or a key drive), a floppy (registered trademark) disk, and a magnetic strip. The storage medium described above may also be implemented by any other appropriate medium such as a database or a server that includes at least one of the storage 1002 and the auxiliary storage device 1003.

The communication device 1004 is a hardware component (transmission/reception device) for communicating with other computers via at least one of a wired network and a wireless network. The communication device 1004 may also be referred to as a network device, a network controller, a network card, or a communication module. The communication device 1004 may include a high-frequency switch, a duplexer, a filter, and a frequency synthesizer to achieve at least one of frequency division duplex (FDD) and time division duplex (TDD). For example, a transmission/reception antenna, an amplifier, a transceiver, and a transmission interface may be implemented by the communication device 1004. The transmission/reception device may be physically or logically separated into a transmitter and a receiver.

The input device 1005 receives external inputs and may be implemented by, for example, a keyboard, a mouse, a microphone, switches, buttons, and sensors. The output device 1006 is an external output device (e.g., a display, a speaker, and/or an LED lamp). The input device 1005 and the output device 1006 may be implemented as a single component (e.g., a touch panel).

The above-described devices including the processor 1001 and the storage 1002 are connected to each other via a bus 1007 for communication. The bus 1007 may be implemented by a single bus, or may be implemented by multiple buses connecting the corresponding devices.

Each of the network node 10 and the user device 20 may include hardware components such as a microprocessor, a digital signal processor (DSP), an application specific integrated circuit (ASIC), a programmable logic device (PLD), and/or a field programmable gate array (FPGA), and some or all of the functional blocks may be implemented by these hardware components. For example, the processor 1001 may be implemented by at least one of these hardware components.

Summary of Embodiments

As described above, an aspect of the embodiments provides a user device having following components. The user device includes
 a receiver configured to receive emergency information from a network; and
 a control unit configured to change a process of detecting whether first emergency information is duplicated with second emergency information upon receiving, by the receiver, the second emergency information after the first emergency information, based on the first emergency information.

According to the above-described configuration, in the duplication detection process upon receiving the emergency information, the user device 20 may change the reception control of the emergency information according to a predetermined condition. That is, a user device is enabled to change the control, upon receiving of emergency information, to receive the emergency information appropriately.

The control unit may change the process of detecting whether the first emergency information is duplicated with the second emergency information in a case where an information element (message ID) for identifying a type of the first emergency information is a predetermined value (message ID). According to the above-described configuration, in the duplication detection process upon receiving the emergency information, the user device 20 may change the duplication detection process based on the message ID of the emergency information.

The control unit may change the process of detecting whether the first emergency information is duplicated with the second emergency information in a case where an application to which the first emergency information is to be indicated is a predetermined application. According to the above-described configuration, in the duplication detection process upon receiving the emergency information, the user device 20 may change the duplication detection process based on the application to which the first emergency information is to be indicated.

A user device may include
a receiver configured to receive emergency information from a network; and
a control unit configured to change, upon receiving, by the receiver, second emergency information after receiving first emergency information, a process of detecting whether the first emergency information is duplicated with the second emergency information in a case where at least one of first, second, and third conditions is satisfied. In the user device, the first condition is the user device being located within a predetermined communication cell, the second condition is the user device detecting predetermined position information, and the third condition is the user device detecting a predetermined movement process. According to the above-described configuration, in the duplication detection process upon receiving the emergency information, the user device 20 may change the duplication detection process based on the current location cell of the user device 20, the position information of the user device 20, and the movement process of the user device 20.

The changing of the process of detecting whether the first emergency information is duplicated with the second emergency information may be a process of changing a period of detecting whether the first emergency information is duplicated with the second emergency information, the period starting from a time of receiving the first emergency information. According to the above-described configuration, the user device 20 may change the duration of duplication detection process, based on the message ID of the emergency information, the application to which the emergency information is indicated, the current location cell of the user device 20, the position information of the user device 20, or the movement process of the user device 20, in the duplication detection process upon reception of the emergency information.

The changing of the process of detecting whether the first emergency information is duplicated with the second emergency information may be a process of starting or stopping of the process of detecting whether the first emergency information is duplicated with the second emergency information. According to the above-described configuration, the user device 20 may control as to whether to start or stop duplication detection process, based on the message ID of the emergency information, the application to which the emergency information is indicated, the current location cell of the user device 20, the position information of the user device 20, or the movement process of the user device 20, in the duplication detection process upon reception of the emergency information.

Supplementary Description of Embodiments

Embodiments of the present invention are described above. However, the present invention is not limited to the above-described embodiments, and a person skilled in the art may understand that variations, modifications, and replacements may be made to the above embodiments. Although specific values are used in the above descriptions to facilitate the understanding of the present invention, the values are just examples and other appropriate values may also be used unless otherwise mentioned. Grouping of subject matter in the above descriptions is not essential for the present invention. For example, subject matter described in two or more sections may be combined as necessary, and subject matter described in one section may be applied to subject matter described in another section unless they contradict each other. Boundaries of functional units or processing units in functional block diagrams do not necessarily correspond to boundaries of physical components. Operations of multiple functional units may be performed by one physical component, and an operation of one functional unit may be performed by multiple physical components. The order of steps in processes described in the embodiments may be changed as long as the consistency of the steps is maintained. Although functional block diagrams are used to describe the network node 10 and the user device 20, the network node 10 and the user device 20 may be implemented by hardware, software, or a combination of them. Software to be executed by a processor of the network node 10 and software to be executed by a processor of the user device 20 according to the embodiments of the present invention may be stored in any appropriate storage medium such as a random access memory (RAM), a flash memory, a read-only memory (ROM), an EPROM, an EEPROM, a register, a hard disk drive (HDD), a removable disk, a CD-ROM, a database, or a server.

Information may also be reported using methods other than those described in the above embodiments. For example, information may be reported by physical layer signaling (e.g., downlink control information (DCI), uplink control information (UCI)), upper layer signaling (e.g., radio resource control (RRC) signaling, medium access control (MAC) signaling, broadcast information (master information block (MIB), system information block (SIB))), other signals, or a combination of them. Also, RRC signaling may be referred to as an RRC message and may be, for example, an RRC connection setup message or an RRC connection reconfiguration message.

The above-described embodiments may be applied to at least one of systems employing LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-Wideband), Bluetooth (registered trademark), and any other appropriate system, and a next generation system implemented by extending any one of these systems. Also, the above embodiments may be applied to a combination of multiple systems (e.g., a combination of at least one of LTE and LTE-A and 5G).

The order of processes, sequences, flowcharts, etc. of each aspect/embodiment described in the present specification may be exchanged as long as there is no inconsistency. The order of steps in sequence charts and flowcharts described in the embodiments may be changed as long as the consistency of the steps is maintained.

Specific operations performed by the base station device in the present application may be performed by an upper node of the network node 10. Specific operations performed by the network node 10 in the present application may be performed by an upper node of the network node 10. In a network comprised of one or more network nodes including the network node 10, various operations performed for communication with the user device 20 may be performed by at least one of the network node 10 and a network node (which is, for example, but is not limited to, MME or S-GW) other than the network node 10. In the above example, it is assumed that there is one network node other than the network node 10. However, there may be two or more types of network nodes (e.g., MME and S-GW) other than the network node 10.

Information or signals described in the present disclosure may be output from the upper layer (or the lower layer) to the lower layer (or the upper layer), and may be input and output via multiple network nodes.

Input/output information may be stored in a specific location (e.g., in a memory), or may be managed using a management table. Input/output information may be overwritten, updated, or added. Output information may be removed. Input information may be transmitted to another apparatus.

In the present disclosure, determination may be made based on a one-bit value (0 or 1) or a truth value (Boolean: true or false), or by comparison of values (e.g., comparison with a predetermined value).

Regardless of whether software is called software, firmware, middleware, a microcode, a hardware description language, or by any other name, software can be interpreted widely to mean a command, a command set, a code, a code segment, a program code, a program, a subprogram, a software module, an application, a software application, a software package, a routine, a subroutine, an object, an executable file, an execution thread, a procedure, or a function.

Also, software, commands, and information may be transmitted and received via a transmission medium. For example, when software is transmitted from a web site, a server, or any other remote source using a wired technology such as a coaxial cable, a fiber optic cable, a twisted pair, or a digital subscriber line (DSL) and/or a wireless technology such as infrared rays or a microwave, at least one of the wired technology and the wireless technology is within the definition of the transmission medium.

Information and signals described in the present disclosure may be represented by using various different technologies. For example, data, instructions, commands, information, signals, bits, symbols, and chips in the above descriptions may be represented by voltages, electric currents, electromagnetic waves, magnetic fields, magnetic particles, optical fields, photons, or any combination of them.

Terms described in the present disclosure and terms necessary to understand the present disclosure may be replaced with terms having the same or similar meanings. For example, a channel and/or a symbol may be replaced with a signal (signaling). Also, a signal may be replaced with a message. A component carrier (CC) may be referred to as a carrier frequency, a cell, or a frequency carrier.

In the present disclosure, the terms "system" and "network" may be used interchangeably.

Also, information and parameters described in the present application may be represented by absolute values, may be represented by relative values relative to predetermined values, or may be represented by other types of information. For example, radio resources may be indicated by indices.

The names used for the above-described parameters are not exclusive names. Also, formulas using those parameters are not limited to those disclosed in the present disclosure. Various channels (e.g., PUCCH and PDCCH) and information elements may be identified by any appropriate names. Since the various channels (e.g., PUCCH, PDCCH, etc.) and information elements (e.g., TPC etc.) can be identified by suitable names, the various names assigned to these various channels and information elements are not for limiting in any point. Accordingly, the names assigned to the channels and the information elements do not limit the channels and the information elements in any respect.

In the present disclosure, terms such as "base station (BS)", "radio base station, "base station apparatus", "fixed station", "NodeB", "eNodeB (eNB)", "gNodeB (gNB)", "access point", "transmission point", "reception point", "transmission/reception point", "cell,", "sector", "cell group", "carrier", and "component carrier" may be used interchangeably. The base station may also be referred to as a macro cell, a small cell, a Femto cell, or a pico cell.

The base station can accommodate one or more (for example, three) cells. When the base station accommodates multiple cells, the entire coverage area of the base station may be divided into multiple smaller areas, and each of the smaller areas may provide a communication service through a base station subsystem (for example, a small indoor base station (RRH: remote radio head). The term "cell" or "sector" refers to a part or the entirety of the coverage area of at least one of the base station and the base station subsystem that provides a communication service in this coverage.

In the present disclosure, the terms "mobile station (MS)", "user terminal", "user equipment UE", and "terminal" may be used interchangeably.

Depending on persons skilled in the art, the mobile station may be called by any other appropriate term such as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or a client.

At least one of the base station and the mobile station may be referred to as a transmission apparatus, a reception apparatus, or a communication apparatus. At least one of the base station and the mobile station may be a device mounted on a mobile body or the mobile body itself. The mobile body may be a vehicle (e.g., automobile or aircraft), an unmanned mobile body (e.g., drone or self-guided vehicle), or a robot (manned or unmanned). At least one of the base station and the mobile station may be an apparatus that does not move during communications. For example, at least one of the base station and the mobile station may be an Internet of Things (IoT) device such as a sensor.

In addition, the base stations in the present disclosure may be replaced with a user terminal. For example, embodiments of the present invention may be applied to a configuration where communications between the base station and the user terminal are replaced with communications (e.g., device-to-device (D2D) or vehicle-to-Everything (V2X) communications) between multiple user devices 20. In this case, the user device 20 may have the functions of the network node 10. Also, terms such as "uplink" and "downlink" may be replaced with a term such as "side" used in terminal-to-terminal communications. For example, an uplink channel and a downlink channel may be replaced with side channels.

Similarly, the user terminal in the present application may be replaced with a base station. In this case, the base station may have the functions of the user terminal.

In the present disclosure, the term "determining" may indicate various operations. For example, "determining" may indicate that one of "judging", "calculating", "computing", "processing", "deriving", "investigating", "looking up (searching, inquiring)" (e.g., searching a data structure such as a table or a database), and "ascertaining" has been performed. Also, "determining" may indicate that one of "receiving" (e.g., reception of information), "transmitting" (e.g., transmission of information), "inputting", "outputting", and "accessing" (e.g., accessing data in a memory) has been performed. Further, "determining" may indicate that one of "resolving", "selecting", "choosing", establishing", and "comparing" has been performed. Thus, "determining" may indicate that an operation has been performed. Also, "determining" may be replaced with a term such as "assuming", "expecting", or "considering".

Terms "connected", "coupled", or variations thereof means any direct or indirect connection or coupling between two or more elements and may include the presence of one or more intermediate elements between two elements which are "connected" or "coupled". The coupling or the connection between the elements may be physical, logical, or a combination thereof. For example, "connecting" may be replaced with "accessing". When used in this disclosure, two elements may be considered to be "connected" or "coupled" with each other using one or more electric wires, cables, and/or a printed electrical connection or using electromagnetic energy having a wavelength in a radio frequency region, a microwave region, or an optical (both visible and invisible) region as non-limiting and non-comprehensive examples.

A reference signal may be abbreviated as RS and may be referred to as a pilot depending on a standard to be applied.

In the present disclosure, "based on" does not mean "based only on" unless otherwise mentioned. In other words, "based on" can mean both "based only on" and "based at least on".

In the present disclosure, terms such as "first" and "second" used to refer to elements do not generally indicate the quantity or the order of those elements. In the present application, such terms may be used to distinguish two or more elements from each other. Accordingly, a first element and a second element do not necessarily indicate that there are only two elements and that the first element needs to come before the second element.

Components in the apparatuses described above may also be referred to as "units", "parts", "circuits", or "devices".

In the present disclosure, similarly to the term "comprising", the terms "include" and "including" and variations thereof are open-ended terms. Also, in the present disclosure, the term "or" does not indicate exclusive OR.

When an article "a", "an", or "the" is attached to a noun in the English translation of the present disclosure, the noun following the article may indicate plural elements.

In this disclosure, "A and B differ" may indicate that "A and B differ from each other" or "A and B differ from C". This also applies to terms such as "separate" and "couple".

The above-described embodiments may be used separately or in any combination, and may also be switched during a process. Predetermined information (e.g., "A is X") may be reported explicitly or implicitly (e.g., by not reporting the predetermined information).

Embodiments of the present disclosure are described above. However, the present invention is not limited to the above-described embodiments, and a person skilled in the art may understand that variations, modifications, and replacements may be made without departing from the scope of the present disclosure. Thus, the above-described embodiments are examples and are not intended to limit the present disclosure.

This international patent application is based on and claims priority to Japanese Patent Application No. 2018-216026 filed on Nov. 16, 2018, and the entire content of Japanese Patent Application No. 2018-216026 is incorporated herein by reference.

DESCRIPTION OF REFERENCE SIGNS 10 network node
110 transmitter
120 receiver
130 configuration unit
140 control unit
20 user device (UE)
210 transmitter
220 receiver
230 configuration unit
240 control unit
30 MME
40 CBC
50 CBE
1001 processor
1002 storage device
1003 auxiliary storage device
1004 communication device
1005 input device
1006 output device

The invention claimed is:
1. A terminal comprising:
a receiver configured to receive emergency information from a network; and
a processor configured to change a process of detecting whether first emergency information is duplicated with second emergency information upon receiving, by the receiver, the second emergency information after the first emergency information, based on the first emergency information,
wherein the processor changes the process of detecting whether the first emergency information is duplicated with the second emergency information in a case where an information element (message ID) for identifying a type of the first emergency information is a predetermined value (message ID), and wherein the changed process of detecting whether the first emergency information is duplicated with the second emergency information is a process of changing a period of detecting whether the first emergency information is duplicated with the second emergency information, the period starting from a time of receiving the first emergency information.

2. The terminal according to claim 1, wherein the processor changes the process of detecting whether the first emergency information is duplicated with the second emergency information in a case where an application to which the first emergency information is to be indicated is a predetermined application.

3. A terminal comprising:

a receiver configured to receive emergency information from a network; and a processor configured to change a process of detecting whether first emergency information is duplicated with second emergency information upon receiving, by the receiver, the second emergency information after the first emergency information, based on the first emergency information, wherein the processor changes the process of detecting whether the first emergency information is duplicated with the second emergency information in a case where an information element (message ID) for identifying a type of the first emergency information is a predetermined value (message ID), and wherein the changed process of detecting whether the first emergency information is duplicated with the second emergency information is a process in which the process of detecting whether the first emergency information is duplicated with the second emergency information is started or is stopped.

4. A terminal comprising:

a receiver configured to receive emergency information from a network; and a processor configured to change, upon receiving, by the receiver, second emergency information after receiving first emergency information, a process of detecting whether the first emergency information is duplicated with the second emergency information in a case where at least one of first, second, and third conditions is satisfied, wherein the first condition is the terminal being located in a predetermined communication cell, the second condition is the terminal detecting predetermined position information, and the third condition is the terminal detecting a predetermined movement process, and wherein the changed process of detecting whether the first emergency information is duplicated with the second emergency information is a process of changing a period of detecting whether the first emergency information is duplicated with the second emergency information, the period starting from a time of receiving the first emergency information.

5. A terminal comprising:

a receiver configured to receive emergency information from a network; and a processor configured to change, upon receiving, by the receiver, second emergency information after receiving first emergency information, a process of detecting whether the first emergency information is duplicated with the second emergency information in a case where at least one of first, second, and third conditions is satisfied, wherein the first condition is the terminal being located in a predetermined communication cell, the second condition is the terminal detecting predetermined position information, and the third condition is the terminal detecting a predetermined movement process, and wherein the changed process of detecting whether the first emergency information is duplicated with the second emergency information is a process in which the process of detecting whether the first emergency information is duplicated with the second emergency information is started or is stopped.

* * * * *